United States Patent
Kumano

(10) Patent No.: US 10,465,301 B2
(45) Date of Patent: *Nov. 5, 2019

(54) LIQUID ACTIVATION AND ELECTROLYTIC APPARATUS AND LIQUID ACTIVATION AND ELECTROLYTIC METHOD

(71) Applicant: Japan System Planning Co., Ltd., Tokyo (JP)

(72) Inventor: Katsuyuki Kumano, Tokyo (JP)

(73) Assignee: JAPAN SYSTEM PLANNING CO., LTD., Tokyo (JP)

( * ) Notice: Subject to any disclaimer, the term of this patent is extended or adjusted under 35 U.S.C. 154(b) by 390 days.

This patent is subject to a terminal disclaimer.

(21) Appl. No.: 14/816,023

(22) Filed: Aug. 2, 2015

(65) Prior Publication Data

US 2016/0040309 A1    Feb. 11, 2016

(30) Foreign Application Priority Data

Aug. 6, 2014  (JP) ................... 2014-160736

(51) Int. Cl.
  *C25B 11/04* (2006.01)
  *B01J 19/08* (2006.01)
  (Continued)

(52) U.S. Cl.
  CPC ............. *C25B 11/04* (2013.01); *B01J 19/087* (2013.01); *B01J 19/121* (2013.01); *B01J 19/123* (2013.01);
  (Continued)

(58) Field of Classification Search
  CPC ........... C25B 11/04; C25B 1/04; C25B 15/08; C25B 9/00; C02F 1/005; C02F 1/481;
  (Continued)

(56) References Cited

U.S. PATENT DOCUMENTS

| 3,864,236 A | * | 2/1975 | Lindstrom | ................ C25B 1/16 |
| | | | | 204/256 |
| 2004/0151957 A1 | * | 8/2004 | Brooks | .................. B01J 19/121 |
| | | | | 429/10 |

(Continued)

FOREIGN PATENT DOCUMENTS

| GB | 2409684 A | 6/2017 |
| JP | 07-256258 A | 10/1995 |

(Continued)

OTHER PUBLICATIONS

English Translation of Foreign Patent Document, JP2006-68621A.

(Continued)

*Primary Examiner* — Nicholas A Smith
*Assistant Examiner* — Colleen M Raphael
(74) *Attorney, Agent, or Firm* — R. Lynette Wylie; Apex Juris, pllc.

(57) ABSTRACT

A liquid activation and electrolytic apparatus includes: a liquid activation apparatus that includes a liquid activator with a black radiation sintered body radiating electromagnetic waves and an electromagnetic wave converging body and assembled bodies integrated together with the black radiation sintered body on the outside, the electromagnetic wave converging body on the inside, and a liquid activation region by the electromagnetic waves formed on the inside of the electromagnetic wave converging body and activates, in the above region, a liquid portion of a liquid electrolytic solution; and an electrolytic unit that includes an electrolysis container using a titanium or platinum electrode as a negative electrode and a platinum electrode as a positive electrode and containing the electrolytic solution and a power source applying a variable direct-current voltage to the negative and positive electrodes and performs the electroly- (Continued)

sis of the electrolytic solution with the activated liquid portion in the electrolysis container.

8 Claims, 9 Drawing Sheets

(51) Int. Cl.
*B01J 19/12* (2006.01)
*C02F 1/00* (2006.01)
*C25B 15/08* (2006.01)
*C25B 1/04* (2006.01)
*C25B 9/00* (2006.01)
*C02F 1/461* (2006.01)
*C02F 1/48* (2006.01)
*C02F 1/32* (2006.01)
*C02F 103/08* (2006.01)

(52) U.S. Cl.
CPC .......... *C02F 1/005* (2013.01); *C02F 1/46104* (2013.01); *C02F 1/482* (2013.01); *C25B 1/04* (2013.01); *C25B 9/00* (2013.01); *C25B 15/08* (2013.01); *B01J 2219/0809* (2013.01); *B01J 2219/0815* (2013.01); *B01J 2219/0822* (2013.01); *B01J 2219/0839* (2013.01); *B01J 2219/0841* (2013.01); *B01J 2219/0852* (2013.01); *B01J 2219/0867* (2013.01); *B01J 2219/0877* (2013.01); *B01J 2219/0892* (2013.01); *C02F 1/32* (2013.01); *C02F 2001/46133* (2013.01); *C02F 2103/08* (2013.01); *Y02A 20/144* (2018.01); *Y02E 60/366* (2013.01)

(58) Field of Classification Search
CPC .................. C02F 1/482; C02F 1/46104; C02F 2001/46133; C02F 2103/08; C02F 1/32; B01J 19/087; B01J 19/121; B01J 19/126; B01J 2219/0877; B01J 2219/0867; B01J 2219/0852; B01J 19/123; B01J 2219/0822; B01J 2219/0841; B01J 2219/0809; B01J 2219/0839; B01J 2219/0892; B01J 2219/0815; Y02A 20/144; Y02E 60/366

See application file for complete search history.

(56) References Cited

U.S. PATENT DOCUMENTS

| | | | |
|---|---|---|---|
| 2004/0173462 A1* | 9/2004 | Letts | G21B 3/00 205/92 |
| 2006/0059998 A1 | 3/2006 | Kumano | |
| 2010/0072074 A1 | 3/2010 | Fowler | |
| 2012/0097550 A1 | 4/2012 | Lockhart | |
| 2012/0193064 A1* | 8/2012 | Farkaly | F01K 3/00 165/10 |
| 2013/0134046 A1 | 5/2013 | Fanchi | |
| 2017/0070180 A1* | 3/2017 | Mills | C25B 1/04 |

FOREIGN PATENT DOCUMENTS

| | | |
|---|---|---|
| JP | 3077656 U | 2/2001 |
| JP | 2001-179256 A | 7/2001 |
| JP | 2006-068621 A | 3/2006 |
| JP | 2009-275258 A | 11/2009 |
| JP | 2013-099735 A | 5/2013 |
| JP | 5824122 B1 | 11/2015 |

OTHER PUBLICATIONS

English Translation of Foreign Patent Document, JP2013-099735A.
English Translation of Foreign Patent Document, JP1995-256258A.
English Translation of Foreign Patent Document, JP2009-275258A.
English Translation of Foreign Patent Document, JP2001-179256A.
English Translation of Foreign Patent Document, JP3077656U.
Research paper entitled "Observation of Large Water-Cluster Anions with Surface-Bound Excess Electrons" by J.R.R. Verlet, A.E. Bragg, A. Kannrath, O. Cheshnovsky, and D.M. Newmark, Science vol. 307, Published on Jan. 7, 2005, Total of 1 page.
EP Search Report for EP15178945,0, dated Nov. 26, 2015, Total of 8 pages.
EP Examination Report for EP15178945.0, dated Jul. 27, 2017, Total of 5 pages.

* cited by examiner

Fig. 16

EXAMPLE

RELATIONSHIP BETWEEN NUMBER OF REVOLUTIONS PER MINUTE OF COMMON ELECTRIC GENERATOR AND GENERATED VOLTAGE

| NUMBER OF REVOLUTIONS PER MINUTE OF ELECTRIC GENERATOR (rpm) | — | VOLTAGE (v) |
|---|---|---|
| 20 | — | 5 |
| 50 | — | 11 |
| 100 | — | 23 |
| 200 | — | 49 |
| 300 | — | 73 |
| 500 | — | 125 |

LIQUID ACTIVATION AND ELECTROLYTIC APPARATUS AND LIQUID ACTIVATION AND ELECTROLYTIC METHOD

BACKGROUND OF THE INVENTION

1. Field of the Invention

The present invention relates to liquid activation and electrolytic apparatuses and liquid activation and electrolytic methods and, more particularly, to novel and innovative liquid activation and electrolytic apparatus and liquid activation and electrolytic method that can efficiently generate hydrogen gas or the like by starting electrolysis at a direct-current low voltage by facilitating the ionization of a liquid portion of an electrolytic solution by activating the liquid portion.

2. Description of the Related Art

In general, an electrode in an electrolytic cell in which the electrolysis of a liquid is performed is a starting point which performs the electrolysis of a liquid such as seawater by causing a chemical reaction by consuming electricity.

As such an electrode, there are a positive pole and a negative pole; at the positive pole, an oxidation reaction by which electrons are released occurs and, at the negative pole, a reduction reaction by which the electrons are accepted occurs.

Moreover, the electrodes are classified into soluble electrodes and insoluble electrodes. Examples of the soluble electrodes include a carbon electrode, an aluminum electrode, a Cu electrode, an Sn electrode, and a Pb electrode.

Examples of the insoluble electrodes include a Pt/Ti electrode which is a metal-plating electrode and an $IrO_2$/Ti electrode which is a metal-sintering electrode.

Of these electrodes, the Pt/Ti electrode which is a metal-plating electrode that is often used in the electrolysis of water is formed by placing an electrocatalyst on a valve metal and using a functional material, such as titanium (a Ti material), which is not eluted even when the material is subjected to polarization in such a way that the material becomes positive. Thus, the following matters are important for the electrode.

(a) Having an electrocatalytic function which differs depending on an electrocatalytic metal.

(b) Having electrical bonding power between a base material (such as a Ti material) and a plating metal (a catalyst).

(c) Not suffering from deterioration such as separation and wear because of the physical strength of the plating metal (the catalyst).

(d) Having a long life as the electrode because of the chemical durability of an electrocatalyst.

(e) Reducing electrode production costs (which requires the technology to make a film as thin as possible).

An electrolysis voltage is a value given by the following expression, and the amount of energy required for an electrolytic operation is determined depending on whether this value is large or small.

Electrolysis voltage (Volt)=theoretical electrolysis voltage+overvoltage+solution resistance At low current density, the Pt/metal electrode is suitable and, in that case, catalytic performance is important.

On the other hand, at high-density currents, an ft-Pt oxide electrode is suitable and oxygen-resistance performance is important.

An electrocatalytic surface has projections and depressions, and these projections and depressions cause a difference in the value of a flowing current in an electrolytic operation in which the distance between the positive and negative poles is small, which makes the value of effective current density larger than the value of apparent current density and exerts a great influence on the electrode life.

In an electrolytic reaction, there is a strong correlation between the ease of adsorption and diffusion of a substance which is subjected to oxidation-reduction to the electrocatalytic surface and the reaction efficiency, and therefore the selection of an electrode which maximizes desired chemical reaction efficiency and the accuracy of making the electrode surface are important matters.

Examples of a combination of a positive pole and a negative pole depending on the type of an electrolytic solution are listed in Table 1 below.

TABLE 1

| | Combination of electrodes | | |
|---|---|---|---|
| | Positive electrode | Electrolytic solution | Negative electrode |
| 1 | platinum | sodium chloride aqueous solution | platinum |
| 2 | carbon rod | copper sulfate (I) aqueous solution | copper |
| 3 | platinum | sodium hydroxide aqueous solution | platinum |
| 4 | copper | hydrochloric acid | copper |
| 5 | carbon rod | potassium iodide aqueous solution | copper |

In Japanese Unexamined Patent Application Publication No. 2013-99735, a hydrogen water generation device including an electrolysis treatment tank that is configured to be capable of containing treated water, electrodes that are configured to perform the electrolysis of the treated water contained in the electrolysis treatment tank, and a current control device that passes a current for performing the electrolysis through the electrodes and controls the current density of the current to be 0.75 $A/dm^2$ or less is proposed.

However, under present circumstances, as with the hydrogen water generation device proposed in Japanese Unexamined Patent Application Publication No. 2013-99735, no electrolysis apparatus can efficiently generate hydrogen gas or the like by starting electrolysis at a direct-current low voltage.

Patent Document

[Patent Document 1] Japanese Unexamined Patent Application Publication No. 2013-99735

SUMMARY OF THE INVENTION

An object of the present invention is to provide an apparatus and a method that can efficiently generate hydrogen gas or the like by starting electrolysis at a direct-current low voltage by facilitating the ionization of a liquid portion of an electrolytic solution.

A main feature of a liquid activation and electrolytic apparatus according to the present invention is that the liquid activation and electrolytic apparatus includes: a liquid activation apparatus including a liquid activator provided with a black radiation sintered body and an electromagnetic wave converging body using a magnet and allowing electromagnetic waves radiated from the black radiation sintered body to pass therethrough while making the electromagnetic waves converge to a fixed wavelength and assembled bodies integrated together in such a way that the black radiation sintered body is located on the outside, the electromagnetic wave converging body is located on the inside, and a liquid activation region by the electromagnetic waves is formed on the inside of the electromagnetic wave converging body, the liquid activation apparatus activating a liquid portion of an electrolytic solution in the liquid activation region, the electrolytic solution which is a liquid; and an electrolytic unit including an electrolysis container using a titanium electrode or a platinum electrode as a negative electrode and a platinum electrode as a positive electrode and containing the electrolytic solution which is a liquid and a power source applying a variable direct-current voltage to the negative electrode and the positive electrode, the electrolytic unit performing the electrolysis of the electrolytic solution with the activated liquid portion in the electrolysis container.

According to first and second aspects of the present invention, it is possible to implement and provide the liquid activation and electrolytic apparatus that can efficiently generate hydrogen gas or the like by starting electrolysis at a direct-current low voltage by facilitating the ionization of the liquid portion of the electrolytic solution by activating the liquid portion of the electrolytic solution by the liquid activation apparatus and then performing the electrolysis of the electrolytic solution by the electrolytic unit.

According to a third aspect of the present invention, it is possible to produce the effect described in the first or second aspect of the present invention by using, as the electrolytic solution, what is obtained by dissolving 0.1 to 30% by weight of an electrolyte such as sodium chloride, potassium chloride, or magnesium chloride in water and implement and provide the liquid activation and electrolytic apparatus suitable for a purpose of generating hydrogen gas or the like by performing the electrolysis of seawater, for example.

According to a fourth aspect of the present invention, by facilitating the ionization of a liquid portion of an electrolytic solution and then performing the electrolysis of the electrolytic solution by an electrolytic unit by adopting an activation step of activating a liquid portion of an electrolytic solution obtained by dissolving 0.1 to 30% by weight of an electrolyte such as sodium chloride, potassium chloride, or magnesium chloride in water in a liquid activation apparatus in which a liquid activation region on which electromagnetic waves act is provided, the electromagnetic waves which are radiated from a black radiation sintered body and are made to converge by a magnet, by the electromagnetic waves; and an electrolysis step of performing electrolysis by putting the electrolytic solution with the activated liquid portion into an electrolysis container of the electrolytic unit using a titanium electrode or a platinum electrode as a negative electrode and a platinum electrode as a positive electrode and applying a variable direct-current voltage to the negative electrode and the positive electrode from a power source, it is possible to implement and provide a liquid activation and electrolytic method that can efficiently generate hydrogen gas or the like by starting electrolysis at a direct-current low voltage.

According to a fifth aspect of the present invention, in the fourth aspect of the present invention, since the activation step activates the liquid portion of the electrolytic solution by circulating the electrolytic solution through a pipe which is passed through the liquid activation region, it is possible to implement and provide the liquid activation and electrolytic method which can activate a large quantity of electrolytic solution successively and is highly-practical.

According to a sixth aspect of the present invention, in the fourth aspect of the present invention, since the activation step activates the liquid portion of the electrolytic solution by placing an electrolysis container containing the electrolytic solution in the liquid activation region, it is possible to implement and provide the liquid activation and electrolytic method that can efficiently perform activation processing to activate a fixed amount of electrolytic solution at a time in accordance with the capacity of the electrolysis container.

According to a seventh aspect of the present invention, in the fourth aspect of the present invention, since the activation step activates the liquid portion of the electrolytic solution by moving an electrolysis container containing the electrolytic solution in the liquid activation region, it is possible to implement and provide the liquid activation and electrolytic method that can efficiently perform activation processing to activate a fixed amount of electrolytic solution at a time in accordance with the capacity of the electrolysis container.

BRIEF DESCRIPTION OF THE DRAWINGS

FIG. 16 is a diagram depicting the relationship between the number of revolutions per minute of a common electric generator and a generated voltage.

DETAILED DESCRIPTION OF THE PREFERRED EMBODIMENTS

The present invention has achieved an object of providing a liquid activation and electrolytic apparatus that can efficiently generate hydrogen gas or the like by starting electrolysis at a direct-current low voltage by an electrolytic unit by facilitating the ionization of a liquid portion of an electrolytic solution by activating the liquid portion of the electrolytic solution by a liquid activation apparatus by a configuration having a liquid activation apparatus including a liquid activator provided with a black radiation sintered body obtained by sintering powder of a plurality of types of metal oxides at high temperature and an electromagnetic wave converging body that allows electromagnetic waves radiated from the black radiation sintered body to pass therethrough while making the electromagnetic waves converge to a fixed wavelength by stacking a plurality of magnets in such a way that north poles and south poles thereof are alternately placed and forming an electromagnetic wave passing hole passing through the stacked magnets and assembled bodies integrated together in such a way that the black radiation sintered body is located on the outside, the electromagnetic wave converging body is located on the inside, and a liquid activation region by the electromagnetic waves is formed on the inside of the electromagnetic wave converging body, the liquid activation apparatus activating a liquid portion of an electrolytic solution in the liquid activation region, the electrolytic solution which is a liquid, and an electrolytic unit including an electrolysis container using a titanium electrode or a platinum electrode as a negative electrode and a platinum electrode as a positive electrode and containing the electrolytic solution which is a liquid and a power source applying a variable direct-current voltage to the negative electrode and the positive electrode, the electrolytic unit performing the electrolysis of the electrolytic solution with the activated liquid portion in the electrolysis container.

Embodiment

Hereinafter, a liquid activation and electrolytic apparatus according to an embodiment of the present invention and a liquid activation and electrolytic method will be described in detail with reference to the drawings.

Figure 1:
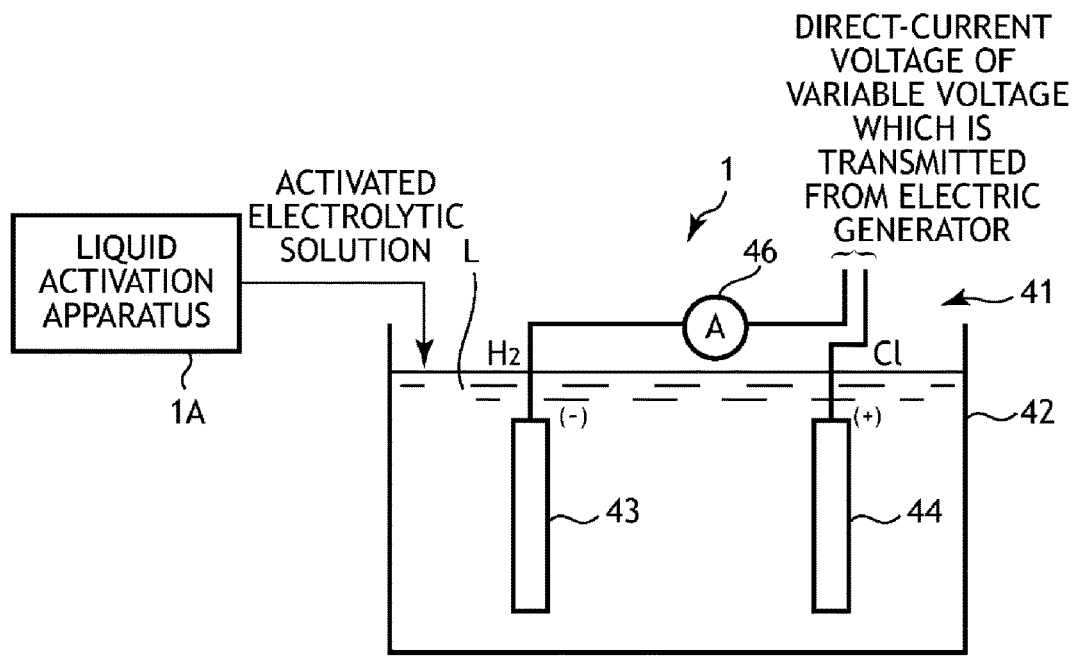
FIG. 1 is a schematic configuration diagram of a liquid activation and electrolytic apparatus according to an embodiment of the present invention.

As depicted in FIG. 1, a liquid activation and electrolytic apparatus 1 according to the embodiment of the present invention includes a liquid activation apparatus 1A that activates a liquid portion of an electrolytic solution L and an electrolytic unit 41 that performs the electrolysis of the electrolytic solution L (or water).

The liquid activation apparatus 1A will be described with reference to FIGS. 2 to 5.

The liquid activation apparatus 1A includes a liquid activator 20 provided with a black radiation sintered body 21 obtained by sintering powder of a plurality of types of metal oxides at high temperature and an electromagnetic wave converging body 22 that allows electromagnetic waves radiated from the black radiation sintered body 21 to pass therethrough while making the electromagnetic waves converge to a fixed wavelength by stacking a plurality of magnets 23 in such a way that north poles and south poles thereof are alternately placed and forming an electromagnetic wave passing hole 25 passing through the stacked magnets 23 and assembled bodies 2A and 2B integrated together in such a way that the black radiation sintered body 21 is located on the outside, the electromagnetic wave converging body 22 is located on the inside, and a liquid activation region E by the electromagnetic waves is formed on the inside of the electromagnetic wave converging body 22, and the liquid activation apparatus 1A is configured to activate, in the liquid activation region E, a liquid portion of an electrolytic solution L which is a liquid, for example, a solution obtained by dissolving 0.1 to 30% by weight of an electrolyte such as sodium chloride, potassium chloride, or magnesium chloride in water.

The liquid activation apparatus 1A will be described in more detail.

The liquid activation apparatus 1A has a pair of assembled bodies 2A and 2B provided on the periphery of a pipe P.

Inside the assembled bodies 2A and 2B, a plurality of liquid activators 20 which are fixed in a stainless cover 10 are placed.

The cover 10 is formed of an arc-shaped outer wall portion 11, side wall portions 12 extending from the side edges of the outer wall portion 11 toward the side where the pipe P is located, and fixing portions 13 extending from the side wall portions 12 outward from the pipe P at a right angle. The liquid activators 20 are integrally fixed to the cover 10 with an epoxy resin 30.

The assembled bodies 2A and 2B with such a configuration are provided on the periphery of the pipe P and are integrally placed with respect to the pipe P as a result of bolts 31 and 32 being passed through the fixing portions 13 and being fastened by nuts 33 and 34.

Each liquid activator 20 is formed of a black radiation sintered body 21 radiating electromagnetic waves and an electromagnetic wave converging body 22 that makes the electromagnetic waves generated from the black radiation sintered body 21 converge to a particular wavelength.

The black radiation sintered body 21 is formed by reducing a plurality of types of metal oxides to powder and sintering the resultant powder at 1000 to 1400° C.

The main ingredients of the metal oxides are the following seven materials: cobalt, nickel, manganese, copper, iron, boron, and aluminum, and metal oxides of five of neodymium, praseodymium, yttrium, lanthanum, cerium, samarium, europium, gadolinium, terbium, dysprosium, holmium, erbium, thulium, ytterbium, lutetium, and chromium are then mixed thereinto to form the metal oxides.

That is, the metal oxides are formed by mixing the total of 12 types of metal oxides.

Figure 4:
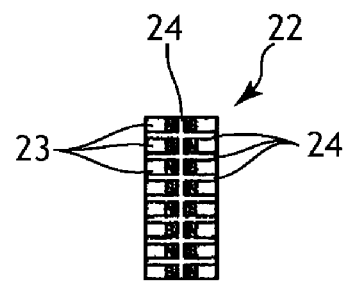
FIG. 4 is a schematic front view depicting an electromagnetic wave converging body of the liquid activation apparatus in the liquid activation and electrolytic apparatus according to this embodiment.
Figure 5:
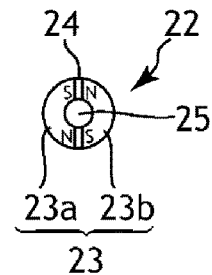
FIG. 5 is a schematic plan view depicting the electromagnetic wave converging body of the liquid activation apparatus in the liquid activation and electrolytic apparatus according to this embodiment.

As depicted in FIGS. 4 and 5, the electromagnetic wave converging body 22 is formed of divided magnets 23a and 23b obtained by dividing a ring-shaped magnet 23 into two parts, the divided magnets 23a and 23b stacked in multiple layers (in this embodiment, eight layers).

The magnets 23 are stacked in such a way that the north poles and the south poles thereof are alternately placed and are integrally connected to each other by a non-magnetic coating 24.

As a result, at the center of the electromagnetic wave converging body 22, a minute electromagnetic wave passing hole 25 having a diameter of 1 mm or less is formed.

The electromagnetic wave converging body 22 guides the electromagnetic waves radiated from the black radiation sintered body 21 to the liquid activation region E while making the electromagnetic waves converge by passing the electromagnetic waves through the electromagnetic wave passing hole 25.

As the electromagnetic wave converging body 22, in addition to the example described above, though not depicted in the drawing, it is also possible to adopt a configuration in which flat-shaped magnets are stacked in multiple layers (for example, eight layers) in such a way that the north poles and the south poles thereof are alternately placed and are integrated together by using a non-magnetic coating and a large number of minute electromagnetic wave passing holes, each having a diameter of 1 mm or less, are provided in such a way as to pass through the stacked flat-shaped magnets.

A liquid activating action of the liquid activation apparatus 1A is as follows.

The black radiation sintered body 21 of the liquid activation apparatus 1A generates electromagnetic waves in the wide range of wavelength. The electromagnetic waves in the wide range of wavelength lose the property of passing through a substance concurrently with the attenuation of the electromagnetic waves due to the interaction between the phases. Therefore, it is possible to activate the electrolytic solution L (or water) by bringing the black radiation sintered body 21 into direct contact with the electrolytic solution L (or water), but, since the electromagnetic waves generated by the black radiation sintered body 21 do not pass through the pipe P, it is impossible to activate the electrolytic solution L (or water) flowing through the pipe P.

In this embodiment, by passing the electromagnetic waves radiated from the black radiation sintered body 21 through the electromagnetic wave passing hole 25 of the magnets 23 whose north poles and south poles are alternately placed, the wavelength phases are matched to each other, whereby a particular laser electromagnetic wave is obtained.

This laser electromagnetic wave passes through the pipe P, which makes it possible to activate the electrolytic solution L (or water) flowing through the pipe P.

The activated electrolytic solution L (or water) can promote the ionization of the electrolytic solution L (or water) and produces the effect of preventing red rust corrosion by an improvement of the blockage ratio of the pipe P as a result of, as is well known, the red rust on the inner wall of the pipe P turning into black rust.

As described above, with a simple configuration using the black radiation sintered body 21 obtained by sintering the metal oxides and the electromagnetic wave converging body 22 which is formed of the magnets 23 and makes the electromagnetic waves generated from the black radiation sintered body 21 converge to a particular wavelength, the liquid activator 20 can activate the electrolytic solution L (or water) while achieving a reduction in the production cost of the liquid activation apparatus 1A.

Next, the electrolytic unit 41 will be described.

As depicted in FIG. 1, the electrolytic unit 41 includes an electrolysis container 42 that uses a titanium electrode or a platinum electrode as a negative electrode 43 and a platinum electrode as a positive electrode 44 and contains the electrolytic solution L with the liquid portion activated by the liquid activation apparatus 1A described above.

Moreover, the electrolytic unit 41 includes an electric generator, though not depicted in the drawing, which generates electric power by using, for example, a variable-wing vane-type waterwheel, which will be described later, and an ammeter 46 that is configured to, by using a variable voltage direct-current power supply converting the electric power generation output of the electric generator into direct-current power, apply a variable direct-current voltage (for example, a direct current of 0 to 500 V) from the variable voltage direct-current power supply to the negative electrode 43 and the positive electrode 44 and measures an electrolytic current.

Furthermore, as the electrolytic unit 41, it is also possible to adopt a configuration with an ultraviolet irradiation source which irradiates the titanium electrode which is the negative electrode 43 with ultraviolet light and forms a titanium oxide layer on the outer surface of the titanium electrode.

In addition, the electrolytic unit 41 is configured to perform the electrolysis of the electrolytic solution L with the activated liquid portion in the electrolysis container 42.

If the titanium electrode is used as the negative electrode 43, when the titanium electrode is oxidized by being heated with a gas burner or the like, a titanium oxide layer 43a is formed on the surface thereof. When the titanium oxide layer 43a is irradiated with the ultraviolet light from the ultraviolet irradiation source, the energy of the ultraviolet light promotes the electrolysis of the electrolytic solution L (or water) on the surface of the titanium oxide layer and accordingly increases the amount of electrolysis.

It is considered that, since the electric energy consumption (power consumption) at the time of electrolysis is expressed by voltage×current, a starting voltage of the electrolysis of the electrolytic solution L (or water) is decreased as compared to a case in which irradiation with ultraviolet light is not performed.

Next, with reference to FIGS. 6 to 13, the liquid activation and electrolytic method for the electrolytic solution L (or water), the liquid activation and electrolytic method using the liquid activation and electrolytic apparatus 1 of the embodiment described above, will be described.

Figure 6:
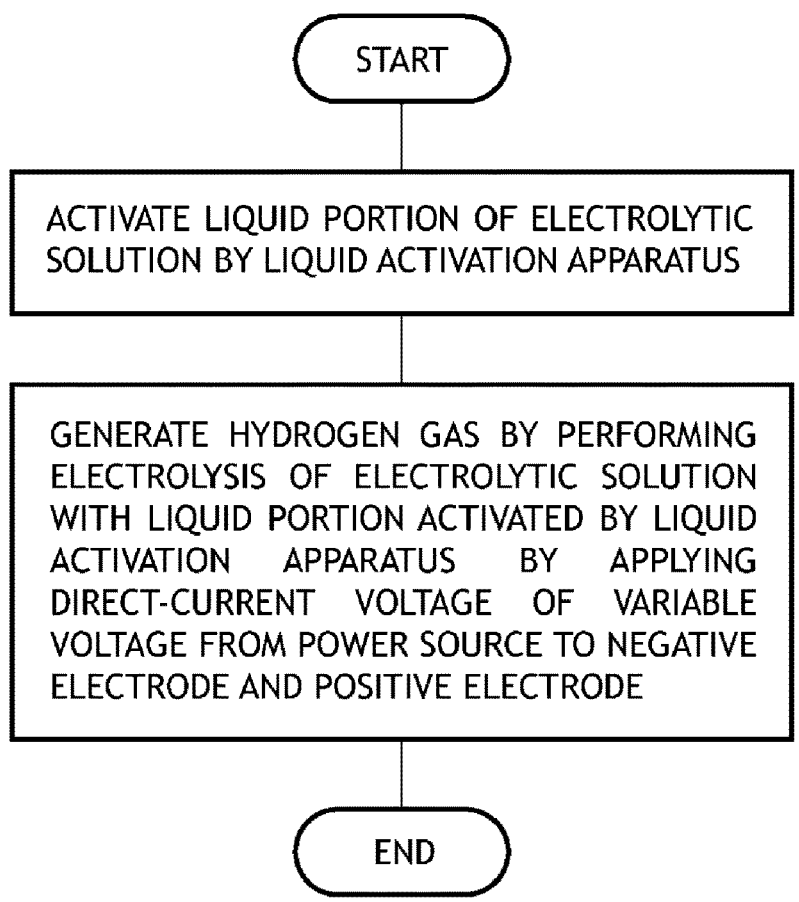
FIG. 6 is a process explanatory diagram of a liquid activation and electrolytic method which is performed by the liquid activation and electrolytic apparatus according to this embodiment.

As depicted in FIG. 6, the liquid activation and electrolytic method of this embodiment includes an activation process which is performed by the liquid activation apparatus 1A and an electrolysis process which is performed by the electrolytic unit 41.

The activation process which is performed by the liquid activation apparatus 1A will be described in separate cases in three types of modes with reference to FIGS. 7 to 10.

(Activation Process A)

Figure 2:
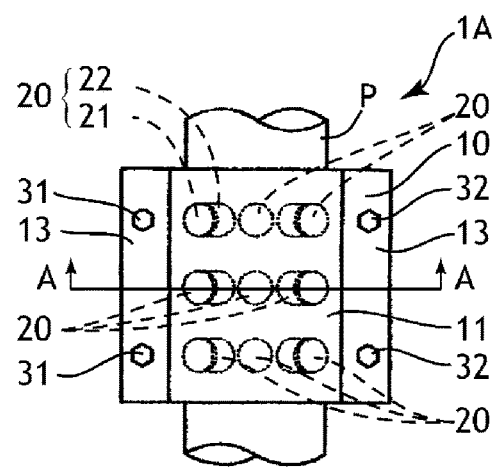
FIG. 2 is a schematic plan view depicting a liquid activation apparatus in the liquid activation and electrolytic apparatus according to this embodiment.
Figure 3:
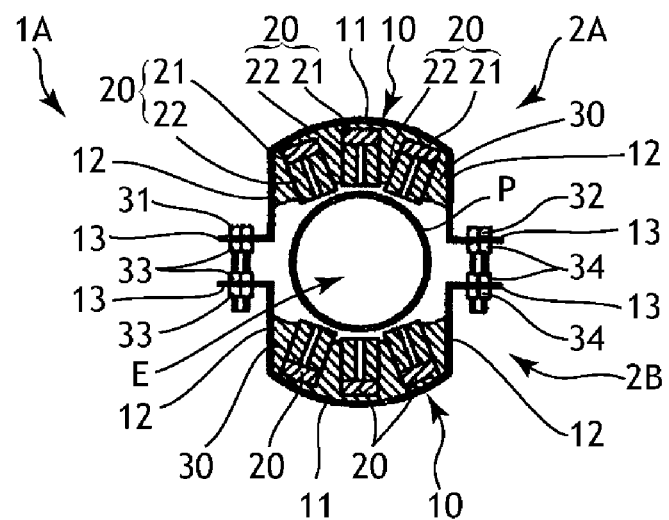
FIG. 3 is a sectional view taken on the line A-A of FIG. 2.
Figure 7:
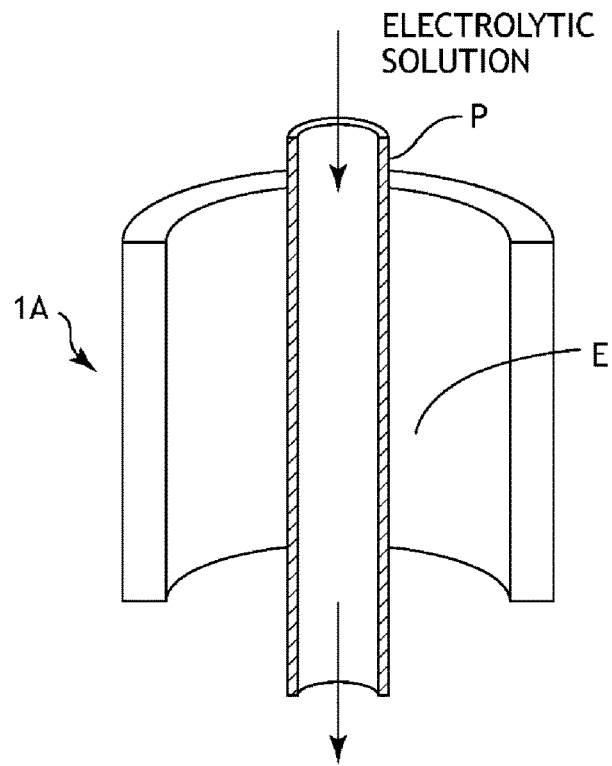
FIG. 7 is a schematic explanatory diagram depicting, in perspective view, an example of an activation process which is performed by the liquid activation apparatus in the liquid activation and electrolytic apparatus according to this embodiment.

As schematically depicted in FIG. 7, as is the case in FIG. 2, an activation process A activates the liquid portion of the electrolytic solution L (or water) by the action similar to that described in the above case by circulating the electrolytic solution L (or water) through the pipe P which is passed through the liquid activation region E of the liquid activation apparatus 1A.

In the activation process A, the electrolytic solution L (or water) is circulated through the pipe P, whereby the liquid portion is activated. This makes it possible to activate a large quantity of electrolytic solution L (or water) successively and thereby implement a highly-practical activation process.
(Activation Process B)

Figure 8:
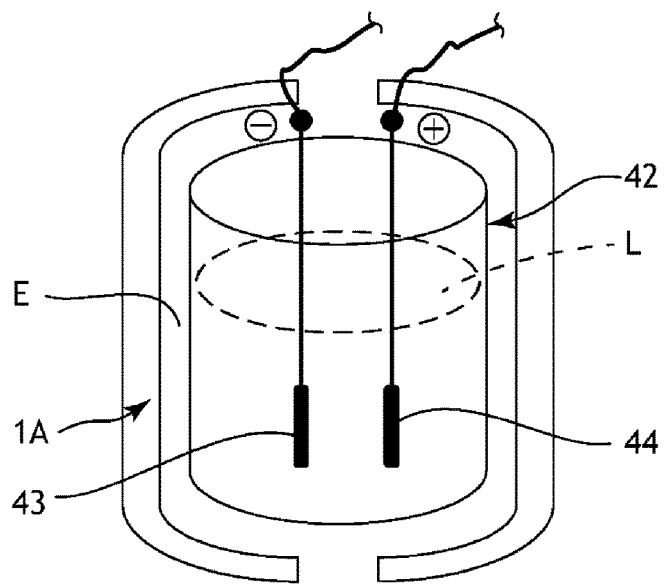
FIG. 8 is a schematic explanatory diagram depicting, in perspective view, another example of the activation process which is performed by the liquid activation apparatus in the liquid activation and electrolytic apparatus according to this embodiment.
Figure 9:
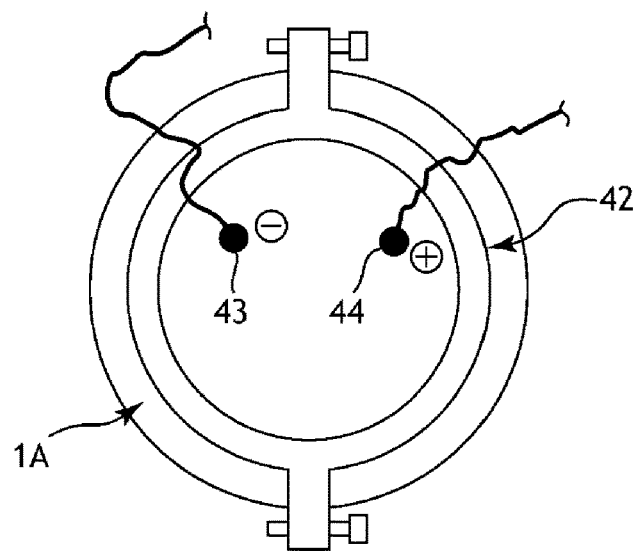
FIG. 9 is a schematic explanatory diagram depicting, in plan view, another example of the activation process which is performed by the liquid activation apparatus in the liquid activation and electrolytic apparatus according to this embodiment.

As schematically depicted in FIGS. 8 and 9, an activation process B activates the liquid portion of the electrolytic solution L (or water) by the action similar to that described in the above case by placing the electrolysis container 42 containing the electrolytic solution L (or water) in the liquid activation region E of the liquid activation apparatus 1A.

In the activation process B, the electrolysis container 42 containing the electrolytic solution L (or water) is placed in the liquid activation region E of the liquid activation apparatus 1A, whereby the liquid portion is activated. This makes the activation process B suitable for activation processing to activate a fixed amount of electrolytic solution L (or water) at a time in accordance with the capacity of the electrolysis container 42.
(Activation Process C)

Figure 10:
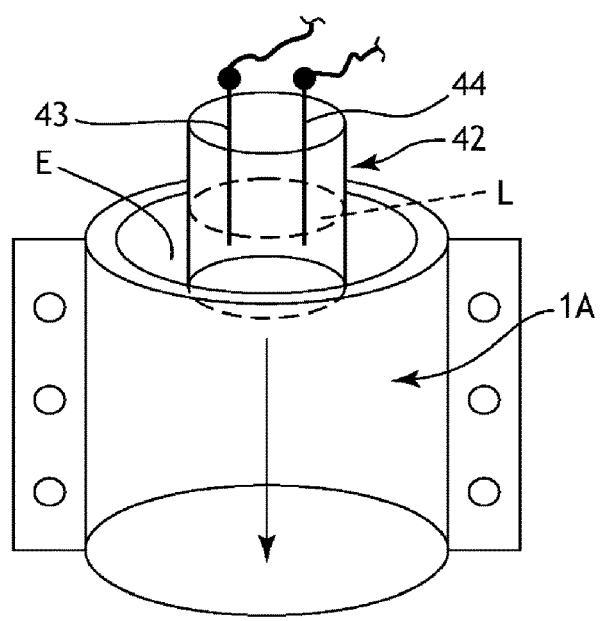
FIG. 10 is a schematic explanatory diagram depicting, in perspective view, still another example of the activation process which is performed by the liquid activation apparatus in the liquid activation and electrolytic apparatus according to this embodiment.

As schematically depicted in FIG. 10, an activation process C activates the liquid portion of the electrolytic solution L (or water) by the action similar to that described in the above case by placing the electrolysis container 42 containing the electrolytic solution L (or water) in the liquid activation region E of the liquid activation apparatus 1A and moving the electrolysis container 42 in the liquid activation region E in a direction of an arrow depicted in FIG. 10.

As is the case with the activation process B, the activation process C is suitable for activation processing to activate a fixed amount of electrolytic solution L (or water) at a time in accordance with the capacity of the electrolysis container 42.

Any one of the activation processes A to C described above is appropriately selected in accordance with the intended use of the electrolytic solution L (or water) to be activated.

Figure 11:
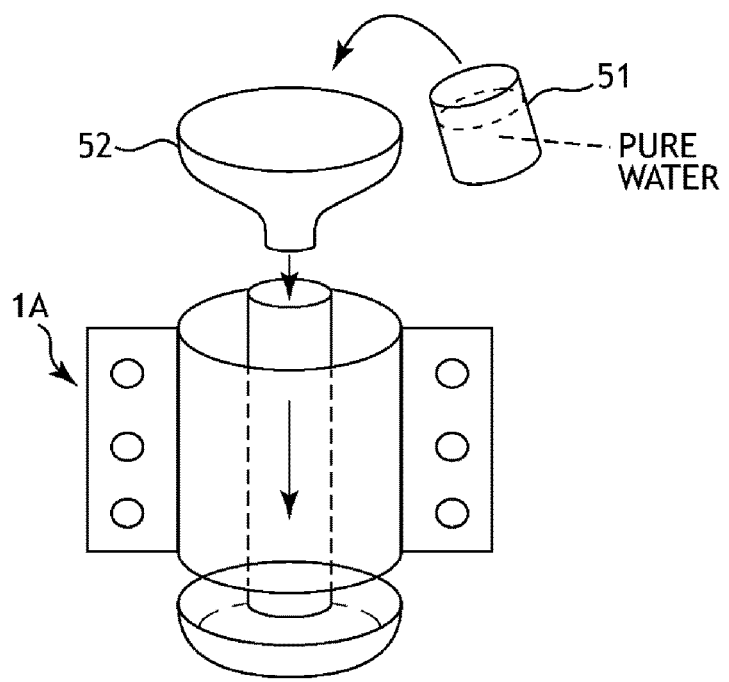
FIG. 11 is a schematic explanatory diagram depicting pure water activation processing which is performed in a preparation stage in an experiment of the liquid activation and electrolytic method which is performed by the liquid activation and electrolytic apparatus according to this embodiment.

Next, an experimental example related to the electrolysis process which is performed by the electrolytic unit 41 will be described with reference to FIGS. 11 to 13.

First, pure water activation processing performed prior to an experiment related to the electrolysis process will be described with reference to FIG. 11.

Water used for the experiment related to the electrolysis process in this embodiment is pure water and contains no electrolyte. As depicted in FIG. 11, this pure water was used after being activated by putting the pure water into a cup 51 and dropping the pure water into the pipe P which is 10 mm in diameter and 20 cm in length, the pipe P placed in the liquid activation region E in the liquid activation apparatus 1A, and circulating the pure water through the pipe P by using a pouring cylinder 52.

Figure 12:
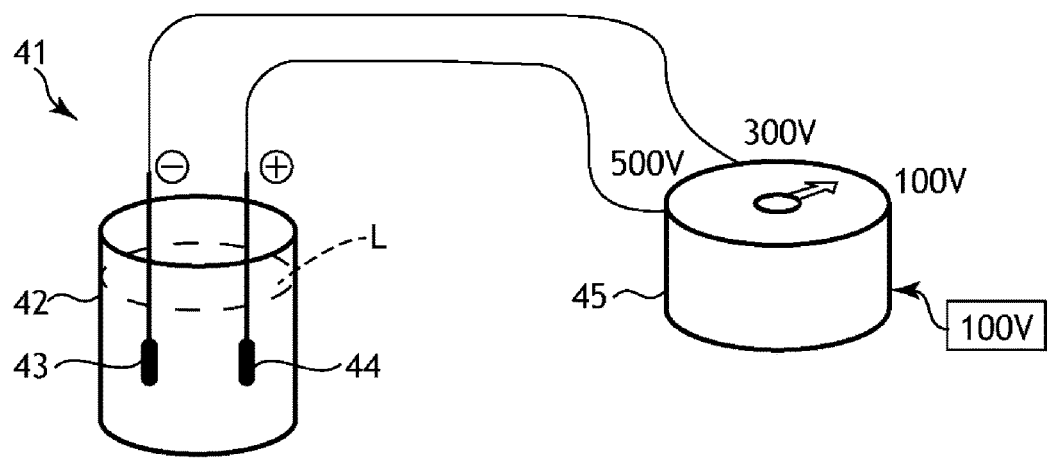
FIG. 12 is a schematic explanatory diagram depicting an electrolysis process which is performed by an electrolytic unit in the experiment of the liquid activation and electrolytic method which is performed by the liquid activation and electrolytic apparatus according to this embodiment.

Next, as depicted in FIG. 12, the electrolysis of the electrolytic solution L was performed by putting common salt into the activated water to achieve a predetermined concentration, putting the resultant water into the electrolysis container 42 depicted in FIG. 1 as the electrolytic solution L, and applying a variable direct-current voltage (a direct current of 0 to 500 V) to the negative electrode 43 and the positive electrode 44 from the variable direct-current voltage source 45.

The titanium electrode was used as the negative electrode 43, and the electrolysis of the electrolytic solution L was performed with the negative electrode 43 being irradiated with the ultraviolet light from the ultraviolet irradiation source 47.

A specific example of such an experiment related to the electrolysis process is as described in Experiments 1 and 2 below.
(Experiment 1)

Electrolysis voltage: 5 to 500 V

The concentration of salt in the electrolytic solution L: 0.2% (ratio by weight)

Figure 13:
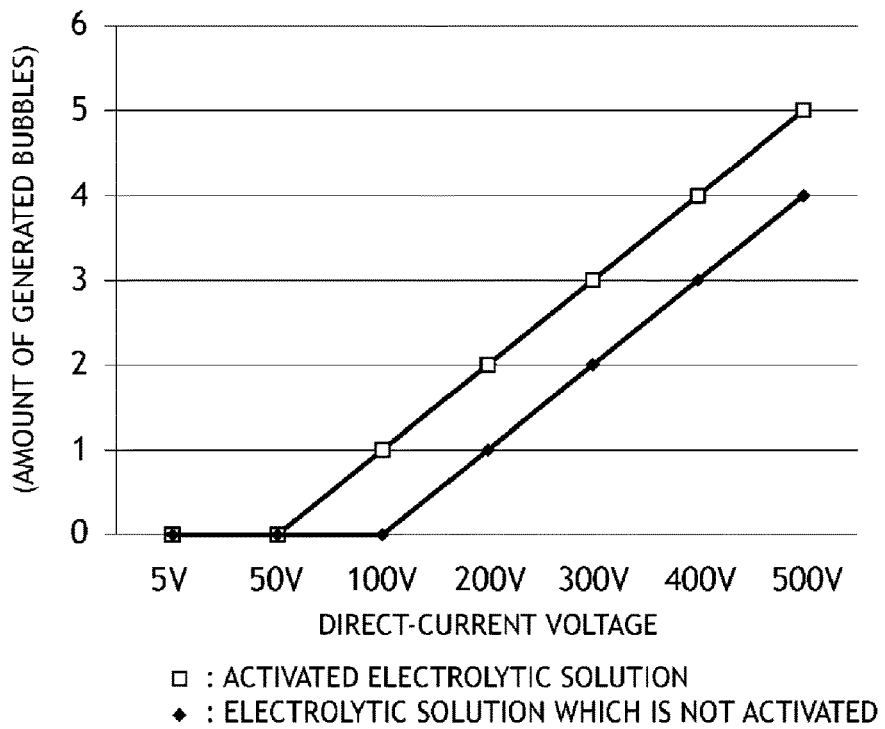
FIG. 13 is a graph depicting the experimental results of the liquid activation and electrolytic method which is performed by the liquid activation and electrolytic apparatus according to this embodiment.

The electrolysis of untreated water which was not passed through the liquid activation apparatus 1A was started when the electrolysis voltage was 100 V and the ammeter 46 indicated 31.2 mA as depicted in FIG. 13.

On the other hand, the electrolysis of the electrolytic solution L which was dropped into the pipe P in the liquid activation apparatus 1A and was passed therethrough was started when the electrolysis voltage was 50 V as depicted in FIG. 13. Moreover, it could be confirmed that the amount of electrolysis (hydrogen bubble generation) increased by 14.4% as compared to the case of the untreated water.

Incidentally, in FIG. 13, the vertical axis of the graph represents the hydrogen bubble generation.
(Experiment 2)

Electrolysis voltage: 5 to 500 V

The concentration of salt in the electrolytic solution L: 1.0% (ratio by weight)

The electrolysis of untreated water which was not passed through the liquid activation apparatus 1A was started when the electrolysis voltage was 20 V and the ammeter 46 indicated 110 mA.

On the other hand, the electrolysis of the electrolytic solution L which was dropped into the pipe P in the liquid activation apparatus 1A and was passed therethrough was started when the electrolysis voltage was 5 V. Moreover, it could be confirmed that the amount of electrolysis (hydrogen bubble generation) increased by 13.6% as compared to the case of the untreated water.

With the liquid activation and electrolytic apparatus 1 of this embodiment described above, by facilitating the ionization of the liquid portion of the electrolytic solution L by activating the liquid portion of the electrolytic solution L by the liquid activation apparatus 1A and then performing the electrolysis of the electrolytic solution L by the electrolytic unit 41, it is possible to generate hydrogen gas or the like efficiently by starting electrolysis at a direct-current low voltage.

According to the embodiment described above, it is possible to perform electrolysis at a low voltage. As described above, if it is possible to perform electrolysis at a lower voltage, in general, when electric power is generated by rotating a propeller or a vane-type rotating body with a fluid, the larger the rotating body becomes, the smaller the number of revolutions per minute.

Figure 14:
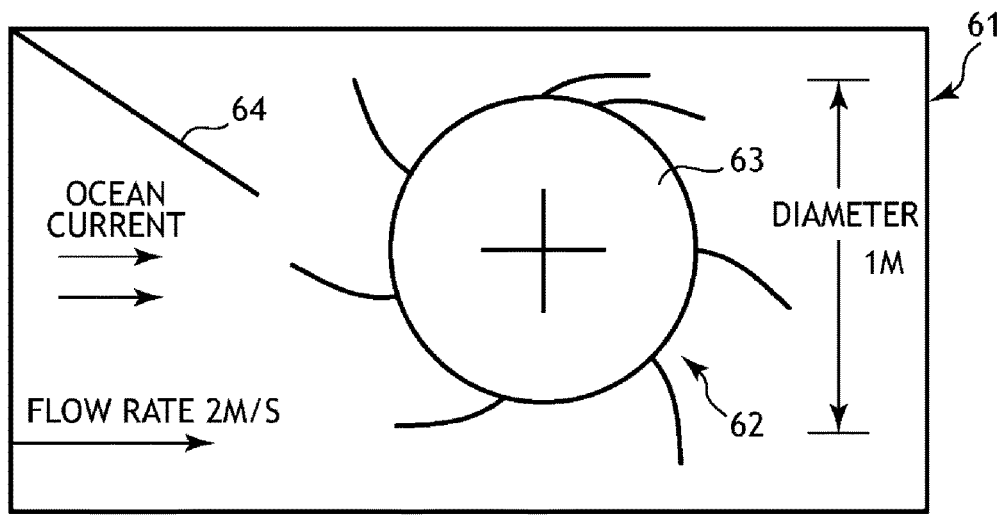
FIG. 14 is a schematic diagram depicting a case in which the diameter of a rotating body of a waterwheel vane-type power generation device is 1 M, the waterwheel vane-type power generation device which is a component element of an electric generation unit in the liquid activation and electrolytic apparatus according to this embodiment.
Figure 15:
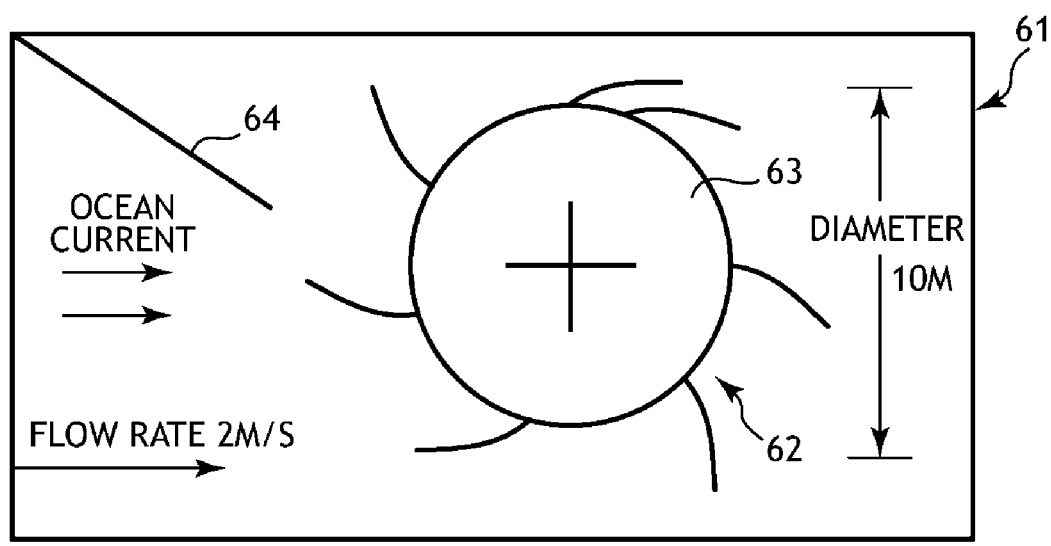
FIG. 15 is a schematic diagram depicting a case in which the diameter of the rotating body of the waterwheel vane-type power generation device is 10 M, the waterwheel vane-type power generation device which is a component element of the electric generation unit in the liquid activation and electrolytic apparatus according to this embodiment.

For example, as depicted in FIGS. 14 and 15, when a variable-wing vane-type waterwheel 62 of a waterwheel vane-type power generation device 61 forming a power source according to Japanese Patent No. 5389082 is rotated under the sea, if the flow rate of an ocean current is 2 M/s and the diameter of a rotating body 63 of the variable-wing vane-type waterwheel 62 is 1 M, the number of revolutions per minute (rpm) is 2 M/(1 M×3.14)×60=about 38 (rpm). If the diameter of the rotating body 63 is increased to 10 M to increase the power generation amount, the number of revolutions per minute (rpm) becomes 2 M/(10 M×3.14)×60=about 3.8 (rpm) and is reduced to 1/10 the number of revolutions per minute in the above case.

Incidentally, in FIGS. 14 and 15, 64 denotes an angle adjustment plate that adjusts the angle at which the ocean current flows into the variable-wing vane-type waterwheel 62 and the electric generator is not depicted. Furthermore, FIG. 16 is a diagram depicting the relationship between the number of revolutions per minute of a common electric generator and a generated voltage.

With the liquid activation and electrolytic method of this embodiment, by performing the electrolysis of the electrolytic solution L by the electrolytic unit 41 at a low voltage of 5 V which is generated at about 20 rpm without using a speed-increasing gear by facilitating the ionization of the liquid portion of the electrolytic solution L by activation by using the liquid activation and electrolytic apparatus 1, it is possible to eliminate the energy loss caused by the speed-increasing gear and generate hydrogen gas or the like (hydrogen gas by a negative electrode reaction and chlorine gas by a positive electrode reaction) efficiently by starting electrolysis at a direct-current low voltage.

The novel and innovative liquid activation and electrolytic apparatus and liquid activation and electrolytic method of the present invention are suitably applied, in particular, to a purpose of generating hydrogen gas from seawater.

What is claimed is:

1. A liquid activation and electrolytic apparatus wherein a liquid portion of an electrolytic solution is activated, comprising:
   a liquid activator provided with a black radiation sintered body, and
      an electromagnetic wave converging body using a magnet and allowing electromagnetic waves radiated from the black radiation sintered body to pass therethrough while making the electromagnetic waves converge to a fixed wavelength and whereby assembled bodies are integrated together in such a way that the black radiation sintered body is located on an outside, the electromagnetic wave converging body is located on an inside, and
      a liquid activation region by the electromagnetic waves is formed on an inside of the electromagnetic wave converging body,
      wherein the liquid activation apparatus activates the liquid portion of the electrolytic solution in the liquid activation region, wherein the electrolytic solution which is a liquid; and
   an electrolytic unit capable of performing electrolysis of the activated electrolytic solution wherein the electrolytic unit includes
      an electrolysis container using a titanium electrode or a platinum electrode as a negative electrode and a platinum electrode as a positive electrode and containing the electrolytic solution which is a liquid, and
      a power source for applying a variable direct-current voltage to the negative electrode and the positive electrode, the electrolytic unit performing electrolysis of the electrolytic solution with the activated liquid portion in the electrolysis container; and
      wherein electrolysis is started at a direct-current voltage by facilitating the ionization of the liquid portion of the electrolytic solution in the electrolytic container of the liquid activation region by the liquid activation apparatus and then performing electrolysis of the activated liquid portion of the electrolytic solution in the electrolysis unit by the liquid activation apparatus in the electrolytic container.

2. The liquid activation and electrolytic apparatus according to claim 1, further comprising the electrolytic solution, and wherein the electrolytic solution is obtained by dissolving 0.1 to 30% by weight of an electrolyte such as sodium chloride, potassium chloride, or magnesium chloride in water.

3. A liquid activation and electrolytic apparatus wherein a liquid portion of an electrolytic solution is activated, comprising:
   a liquid activator provided with a black radiation sintered body obtained by sintering powder of a plurality of types of metal oxides at high temperature, and
      an electromagnetic wave converging body that allows electromagnetic waves radiated from the black radiation sintered body to pass therethrough while making the electromagnetic waves converge to a fixed wavelength by stacking a plurality of magnets in such a way that north poles and south poles thereof are alternately placed and forming an electromagnetic wave passing hole passing through the stacked magnets and assembled bodies integrated together in such a way that the black radiation sintered body is located on the outside, the electromagnetic wave converging body is located on the inside, and
      a liquid activation region by the electromagnetic waves is formed on the inside of the electromagnetic wave converging body,
      the liquid activation apparatus activating the liquid portion of the electrolytic solution in the liquid activation region, the electrolytic solution which is a liquid; and
   an electrolytic unit capable of performing electrolysis of the activated electrolytic solution including an electrolysis container using a titanium electrode or a platinum electrode as a negative electrode and a platinum electrode as a positive electrode and containing the electrolytic solution which is a liquid, and
      a power source for applying a variable direct-current voltage to the negative electrode and the positive electrode, the electrolytic unit performing the electrolysis of the electrolytic solution with the activated liquid portion in the electrolysis container; and
      wherein electrolysis is started at a direct-current voltage by facilitating the ionization of the liquid portion of the electrolytic solution in the electrolytic container of the liquid activation region by the liquid activation apparatus and then performing electrolysis of the activated liquid portion of the electrolytic solution in the electrolysis unit by the liquid activation apparatus in the electrolytic container.

4. The liquid activation and electrolytic apparatus according to claim 3, wherein the electrolytic solution is obtained by dissolving 0.1 to 30% by weight of an electrolyte such as sodium chloride, potassium chloride, or magnesium chloride in water.

5. A liquid activation and electrolytic method comprising:
   an activation step of activating a liquid portion of an electrolytic solution obtained by dissolving 0.1 to 30% by weight of an electrolyte such as sodium chloride, potassium chloride, or magnesium chloride in water in a liquid activation apparatus in which a liquid activation region on which electromagnetic waves act is provided, the electromagnetic waves which are radiated from a black radiation sintered body and are made to converge by a magnet, by the electromagnetic waves; and
   an electrolysis step of performing electrolysis by putting the electrolytic solution with the activated liquid portion into an electrolysis container of an electrolytic unit using a titanium electrode or a platinum electrode as a negative electrode and a platinum electrode as a positive electrode and applying a variable direct-current voltage to the negative electrode and the positive electrode from a power source;

wherein electrolysis is started at a direct-current voltage by facilitating the ionization of the liquid portion of the electrolytic solution in the electrolytic container of the liquid activation region by the liquid activation apparatus and then performing electrolysis of the activated liquid portion of the electrolytic solution in the electrolysis unit by the liquid activation apparatus in the electrolytic container.

6. The liquid activation and electrolytic method according to claim 5, wherein the activation step activates the liquid portion of the electrolytic solution to facilitate ionization of the liquid portion by circulating the electrolytic solution of which salinity is 1.0% through a pipe which is passed through the liquid activation region.

7. The liquid activation and electrolytic method according to claim 5, wherein the activation step activates the liquid portion of the electrolytic solution by placing an electrolysis container containing the electrolytic solution in the liquid activation region.

8. The liquid activation and electrolytic method according to claim 5, wherein the activation step activates the liquid portion of the electrolytic solution by moving an electrolysis container containing the electrolytic solution in the liquid activation region.

* * * * *